April 30, 1957 B. J. McGOVERN ET AL 2,790,629
VALVE FOR A MILK TANK TRUCK
Filed July 27, 1954 2 Sheets-Sheet 1
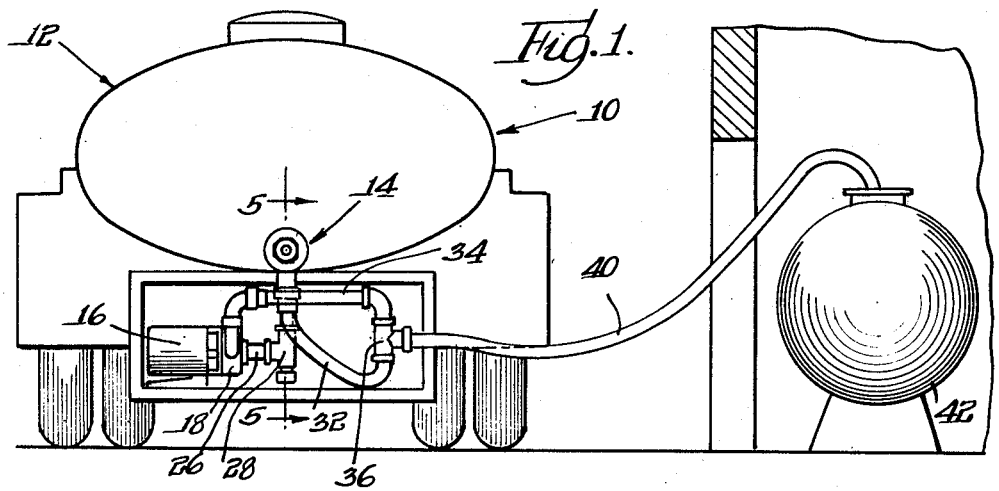
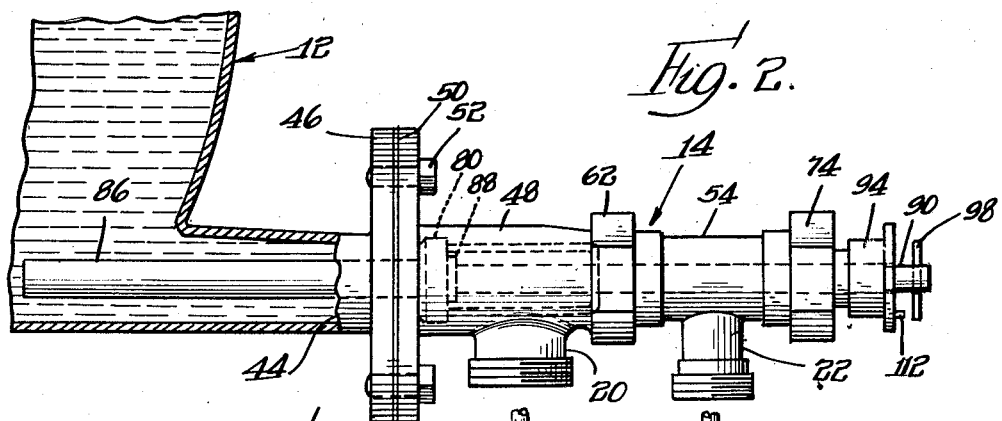
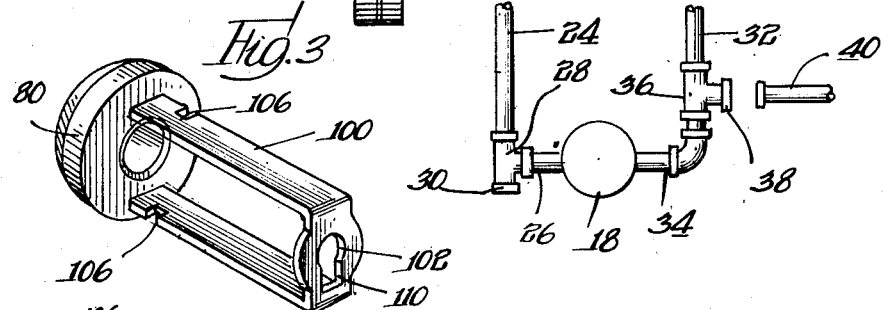
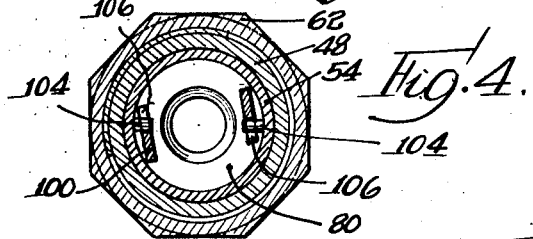
INVENTORS
Bernard J. McGovern
Sigmund P. Skoli
Chester Witt
By:- Olson & Trexler attys.

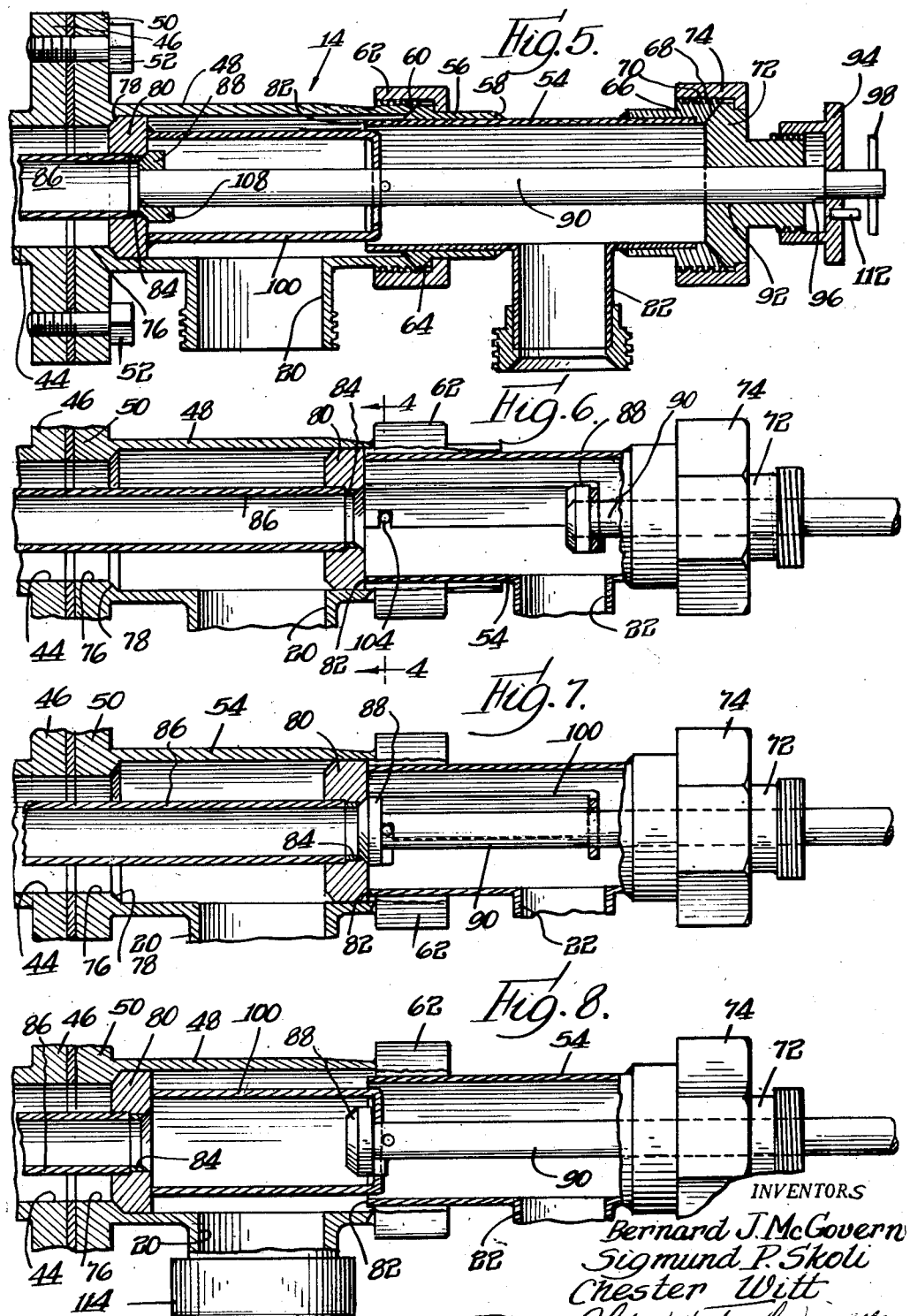

United States Patent Office 2,790,629
Patented Apr. 30, 1957

2,790,629

VALVE FOR A MILK TANK TRUCK

Bernard J. McGovern, Chicago, Sigmund P. Skoli, Elmwood Park, and Chester Witt, Deerfield, Ill., assignors to Mojonnier Bros. Co., Chicago, Ill., a corporation of Illinois Application July 27, 1954, Serial No. 445,984

9 Claims. (Cl. 259—95)

The present invention relates to a novel tank truck structure of the type used to transport fluid such as milk and more particularly, to a novel structure which may be used to agitate and mix the fluid within the tank.

In milk tank trucks, it is frequently desirable to provide means for agitating and mixing the milk so as to insure uniformity of butterfat dispersion through the milk for sampling purposes. Such sampling is usually done prior to unloading the milk at the dairy, and determines the price to be paid for the milk. In some cases, it may be desirable to agitate the milk during transit of the truck but most particularly, it is desirable to agitate and mix the milk just prior to unloading at the dairy. In the past, milk trucks have often been provided with special motor driven mechanical agitator units which are relatively expensive. An object of the present invention is to provide milk trucks with novel and relatively inexpensive means for agitating and mixing the milk within the tank prior to unloading and if desired, during transit of the truck.

More specifically, it is an object of the present invention to provide a tank truck structure including novel valve means which may be used for circulating and agitating the fluid or milk within the tank.

A further object of the present invention is to provide a tank truck structure with novel valve means of the type mentioned in the preceding paragraph, which valve means may also be used for unloading purposes and also if desired, for loading of the tank.

Still another object of the present invention is to provide a novel valve structure of the above described type which may be easily mounted on the tank in place of a conventional outlet valve.

Other objects and advantages of the present invention will become apparent from the following description and the accompanying drawings wherein:

Fig. 1 is an end view of a milk tank truck incorporating the novel structure of this invention;

Fig. 2 is an enlarged fragmentary view showing the novel valve structure of this invention connected with a tank and diagrammatically showing how the valve structure may be connected with the pump;

Fig. 3 is an enlarged perspective view showing an element of the novel valve structure of this invention;

Fig. 4 is a cross sectional view taken along line 4—4 in Fig. 6;

Fig. 5 is an enlarged fragmentary cross sectional view taken along line 5—5 in Fig. 1 and showing the various valve members of the valve structure in their fully closed positions;

Fig. 6 is a cross sectional view similar to Fig. 5 but showing the valve members in their fully opened positions;

Fig. 7 is a cross sectional view similar to Fig. 5 but showing the valve members positioned so that the valve structure may be used to discharge fluid from the tank; and Fig. 8 is a cross sectional view similar to Fig. 5 but showing the valve members positioned so that the valve structure may be used for loading the tank.

Referring now more specifically to the drawings wherein like parts are designated by the same numerals throughout the various figures, a tank truck structure 10 embodying the principles of this invention is shown in Fig. 1 and includes a tank 12, a valve structure 14, a suitably supported electric motor 16 and a pump 18 driven by the motor. The valve structure includes body means having an outlet passageway or coupling 20 and an inlet passageway or coupling 22. The outlet coupling 20 is connectable with the inlet side of the pump 18 through conduit means including sections 24 and 26 and a T member 28. The free end of the T member is normally closed by a suitable threaded cap 30 during all operations except loading of the tank as will be described more fully hereinbelow. The inlet passageway or coupling 22 may be connected with the outlet side of the pump through conduit means including sections 32 and 34 and a T member 36. The stem of the T member 36 may also be closed by a threaded cap 38 and upon removal of this cap, the stem is adapted to be connected with a discharge hose or conduit 40. As shown in Fig. 1, the discharge hose 40 may be connected to a tank 42 at the dairy so that the milk may be pumped directly from the tank truck to the dairy tank.

As shown best in Figs. 2 and 5, the tank 12 is provided with a single opening or fluid passageway 44 adjacent its bottom and a valve mounting plate 46 surrounds this opening and is welded or otherwise secured to the tank. Conventional drain or outlet valves have heretofore been mounted to the truck tank by means similar to the mounting plate 46. Thus, it will be appreciated from the description given below that the novel valve structure of this invention may be mounted on tank trucks now in use without requiring any expensive modifications of the tank trucks. More specifically, by referring to the drawings, it is seen that the valve structure 14 includes a tubular body portion 48 having an end flange 50 adapted to register with and be secured to the mounting plate 46. Many suitable means such as screws 52 may be provided for securing the flange 50 to the plate 46.

The body means of the valve structure 14 includes a second tubular section 54 having an annular member 56 welded thereto as at 58. The section 54 extends within the outer end of the tubular section 48 and the annular member 56 is provided with a beveled end surface 60 adapted to mate with a complementary beveled end surface of the section 48 to provide a fluid-tight seal. A nut member 62 acting against a shoulder 64 on the annular member 56 is threaded onto the end of the body section 48 for retaining the two body sections in assembled relationship. The opposite or outer end of the body section 54 also has disposed thereon an annular member 66 which has a beveled end surface 68 and a threaded peripheral portion 70. This end of the body section 54 is closed by means of a plug 72 which mates with the beveled end surface 68 and is held in assembled relationship by means of a nut member 74.

The inner end of the valve body member or section 48 is provided with an opening 76 which communicates with the tank opening or passageway 44. A valve seat 78 is formed on the body section 48 and surrounds the opening 76. A shiftable valve member 80 is provided for engaging the valve seat 78 and closing the opening 76. In addition, the valve member 80 is moveable into engagement with a valve seat provided by the inner end 82 of the body section 54 for the purpose described below. It should be noted that in accordance with the present invention, the valve member 80 is provided with a passageway or opening 84 therethrough and an elongated fluid conduit or nozzle 86 has one end thereof secured to the valve member 80 in communication with the opening 84. The opposite end of the conduit or nozzle 86 extends through the opening 76 and for a substantial distance along the bottom of the truck tank. The valve structure is provided with a second valve member 88 for closing the opening 84 in the valve member 80.

In order to shift the valve members to the various positions to be described below, the valve member 88 is secured to an elongated valve stem or rod 90 which extends out of the body means through a suitable bore 92 formed in the plug 72 and snugly and slidably confining the rod. Knob 94 is removably threaded onto the plug 72 and acts against a shoulder 96 on the rod 90 for locking the valve members in their closed positions shown in Fig. 5. The knob 94 may be unthreaded from the plug and pulled backwardly or outwardly so that it engages a cross pin 98 mounted on the rod 90 whereupon further backward pulling of the knob causes the rod 90 and the valve member 88 to be moved from the position shown in Fig. 5 toward the right.

As shown in the drawings and particularly in Figs. 3 and 4, a U-shaped strap 100 is welded or otherwise secured to the valve member 80 and is provided with an aperture 102 in its closed end through which the valve stem or rod 90 slidably extends. Thus, the valve member 80 is moved from its closed position shown in Fig. 5 by pulling out the rod 90 until the valve member 88 engages the closed end of the U-shaped strap whereupon the valve member 80 will move toward the right with the valve member 88. The valve member 80 may be moved from the position shown in Fig. 5 to the position shown in Fig. 6 at which it engages the seat 82.

In order to lock the valve member 80 in the Fig. 6 position, means now to be described is provided. This means includes one or more pins 104 fixed on and extending inwardly from the wall of the body section 54. In addition, the legs of the U-shaped strap 100 are provided with notches 106 adapted to receive the pins whereby the valve member 80 is locked against axial movement. The notches 106 may be moved into and out of cooperative relationship with the pins by rotating the valve stem or rod 90 may be interconnected with the strap 100 by means of a lug 108 on the valve member 88 adapted to project into a slot 110 in the closed end of the U-shaped strap. The rod 90 may be turned by means of the cross pin 98 but preferably a pin 112 is fixed on the cap 94 so that upon rotation of the cap, the pin 112 engages the cross pin 98 and causes rotation of the rod. It is, of course, understood that the cap 94 must be removed from the plug 72 and brought substantially into engagement with the cross pin 98 before the pins 98 and 112 will be disposed in cooperative relationship.

The above described structure may be operated to agitate and mix the fluid within the tank 12 in the following manner. The valve members 80 and 88 are moved from their closed positions to the positions shown in Fig. 6. With the valves in the latter mentioned positions, it is seen that fluid may flow out of the passageway or opening 44 in the tank and into the valve body structure through the opening 76. The valve member 80 prevents direct flow of fluid between the outlet and inlet passages 20 and 22 and thus, the fluid is directed through the outlet passage 20 and to the inlet side of the pump. The fluid is forced by the pump into the valve body section 54 through the inlet passage 22 and then into the conduit or nozzle 86. The nozzle 86, of course, directs the fluid back into the tank through the opening 44. As shown best in Fig. 2, the nozzle 86 projects a substantial distance into the tank and is disposed adjacent the bottom of the tank. With this arrangement, the fluid emerging from the nozzle or conduit 86 tends to flow along the bottom of the tank and then rise when it reaches the opposite end of the tank. At the same time, of course, fluid is being withdrawn from the tank through the same opening 44. Thus, the entire body of fluid within the tank is circulated and agitated and it has been found that the efficiency of the agitating and mixing process is the highest when the single tank opening 44 is utilized both as the fluid outlet and the fluid inlet opening as distinguished from a proposed structure, not shown, having spaced inlet and outlet tank openings.

The above described structure may be used for unloading or discharging the fluid from the tank by connecting the discharge hose 40 to the T member 36 and by moving the valve members 80 and 88 to the positions shown in Fig. 7. With the valve members in this position, it is seen that the fluid may still pass from the tank and out the outlet passageway 20 to the pump, but the fluid under pressure from the pump is prevented from re-entering the tank by the valve member 88 closing the conduit 86. Thus, the fluid discharge from the pump is directed out through the discharge hose 40. If desired, agitation of the fluid within the tank may be continued during the unloading process by opening the valve member 88 so that a portion of the fluid is recirculated within the tank while another portion of the fluid is discharged through the hose 40.

The structure of this invention may also be utilized for loading the truck tank. To accomplish this result, the outlet passage 20 is disconnected from the pump and closed by a means of a cap member 114 as shown in Fig. 8. In addition, the T member 28 is connected to a conduit or hose, not shown, which, in turn, is connected to a supply of fluid, not shown. Of course, either the above described conduit section 24 or the end of the T member 28 to which the conduit section 24 is normally connected should be capped off and the discharge hose 40 is disconnected from the T member 36. Then by leaving the valve member 80 in its closed position and by opening the valve member 88 to the position shown in Fig. 8, the fluid from the source of supply may be pumped into the truck tank.

It will be understood that the electric motor 16 which drives the pump 18 may be energized from a source of electricity on the truck or from a suitable outside source of electricity. Furthermore, while it is preferable to mount the motor and pump on the truck for many installations, the present invention also contemplates a situation wherein the motor and pump may be omitted from the truck and provided as a separate unit at the loading and unloading stations. Thus, in instances when it is unnecessary to agitate the fluid or milk in the truck tank during transit of the truck, it may be preferable to provide the motor and pump as a separate unit which may be connected with the valve at the loading or unloading stations such, for example, as at the dairy. With this arrangement, a single motor and pump unit may be used to service a plurality of trucks. It is understood, of course, that the inlet and outlet passages or couplings 22 and 20 of the valve structure should be capped during transit of the truck when the motor and pump is provided as a separate unit.

While the preferred embodiment of the present invention has been shown and described herein, it is obvious that many structural details may be changed without departing from the spirit and scope of the appended claims.

The invention is claimed as follows:

1. In a tank truck structure the combination comprising a tank having a combined inlet and outlet passageway, valve body means having an opening communicating with said tank passageway, said body means having an inlet passageway and an outlet passageway, pump means having an inlet connected with said body means outlet passageway and an outlet connected with said body means inlet passageway and also connectable with a fluid discharge line, conduit means within said body means communicating with said body means inlet passageway and extending through said opening, a shiftable valve member through which said conduit means extends within said body means selectively for closing said opening, for directing fluid from said tank passageway to the pump, and a second shiftable valve member within said body means for selectively opening said conduit means and directing fluid back through said tank passageway and for closing said conduit means for permitting fluid to flow from said tank passageway through the pump and out a discharge line.

2. In a tank truck structure, the combination comprising a tank, a single opening in a wall thereof adjacent a bottom thereof providing a combined inlet and outlet passageway, outlet conduit means connectable with said tank opening located adjacent the bottom of the tank and connectable with an inlet of a pump, additional conduit means connectable with an outlet of the pump and having an elongated nozzle portion extending through said outlet conduit means and tank opening and along the bottom of the tank so that fluid may be withdrawn from and forced into the tank through the same opening and circulation and agitation of the entire body of fluid within the tank is promoted, and valve means including a valve member through which said additional conduit means extends for closing said opening, and a second valve member for closing said additional conduit means, said valve means being operable for selectively closing said opening and said additional conduit means, permitting fluid to flow through said outlet conduit means and said opening while maintaining said additional conduit means closed and opening both of said conduit means.

3. A valve structure for controlling flow of fluid into and out of a tank comprising body means having an opening adapted to communicate with an opening in the tank, an inlet passage and an outlet passage, means providing a valve seat between said inlet and outlet passages, shiftable valve means within said body means for selectively closing said body means opening and engaging said valve seat, means providing fluid conduit means by-passing said valve means and adapted to extend into the tank opening, and a shiftable valve member for selectively closing and opening said fluid conduit means.

4. A valve structure for controlling flow of fluid into and out of a tank comprising body means having an opening adapted to communicate with an opening in the tank, an inlet passage and an outlet passage, means providing a valve seat between said inlet and outlet passages, shiftable valve means within said body means for selectively closing said body means opening and engaging said valve seat, means for releasably locking said valve means in engagement with said valve seat, means providing fluid conduit means by passing said valve means and adapted to extend into said tank opening, and a shiftable valve member for selectively closing and opening said fluid conduit means.

5. A valve structure for controlling flow of fluid into and out of a tank comprising body means having an opening adapted to communicate with an opening in the tank, an inlet passage and an outlet passage, means providing a valve seat between said inlet and outlet passages, shiftable valve means within said body means for selectively closing said body means opening and engaging said valve seat, means for releasably locking said valve means in position to close said body means opening, means for releasably locking said valve means in engagement with said valve seat, means providing fluid conduit means by passing said valve means and adapted to extend into said tank opening, and a shiftable valve member for selectively closing and opening said fluid conduit means.

6. A valve structure for controlling the flow of fluid into and out of a tank comprising body means having an opening adapted to communicate with an opening in the tank, an inlet passage and an outlet passage communicating with said opening, valve means shiftable within said body means for selectively closing said body means opening and for preventing flow of fluid directly between said inlet and outlet passages, means providing fluid conduit means by passing said valve means and adapted to extend into said tank opening, a shiftable valve member for selectively closing and opening said fluid conduit means, and means for releasably locking said valve means in position to close said body means opening and said valve member in position to close said conduit means.

7. A valve structure for controlling flow of fluid into and out of a tank comprising means providing a fluid passageway defined by a valve seat and adapted to communicate with the interior of the tank, a pair of fluid passageway means communicating with said first mentioned passageway at spaced locations, a second valve seat in said first mentioned passageway between said pair of passageway means, a shiftable valve member selectively engageable with said valve seat and said second valve seat, means providing an opening through said valve member, fluid conduit means connected to said valve member in communication with said opening and extending from the valve member through said valve seat for communicating with the interior of the tank, and a second valve member movable relative to said first valve member for closing said opening.

8. A valve structure for controlling flow of fluid into and out of a tank comprising body means having an opening adapted to communicate with an opening in the tank, a first passageway connectable with a pump or the like and a second passageway connectable with a pump or the like, passageway means extending between said first and second passageways and communicating with said body means opening, valve means shiftable within said body means for selectively closing said body means opening and preventing flow of fluid through said passageway means directly between said first and second passageways, conduit means extending through said body means opening and said valve means for connecting said first passageway and the tank, and a valve member for controlling the flow of fluid through said conduit means, said valve structure when connected with a tank and a pump or the like functioning to direct fluid from the tank for re-circulation to the tank when said valve means is in position to prevent fluid flow directly between said passageways and when said valve member is disposed to open said conduit means.

9. A valve structure for controlling flow of fluid into and out of a tank comprising body means having an opening defined by valve seat adapted to communicate with the interior of the tank, said body means having an inlet passageway and an outlet passageway, means within said body means providing a valve seat between said inlet and outlet passageways, a shiftable valve member within said body means for selectively engaging said valve seats, said valve member having an opening therethrough, a fluid conduit secured to said valve member in communication with said opening therethrough and extending out of said body member through said first mentioned valve seat, and a second shiftable valve member for controlling the flow of fluid through said conduit.

References Cited in the file of this patent

UNITED STATES PATENTS

| | | |
|---|---|---|
| 1,706,418 | Sissom | Mar. 26, 1929 |
| 1,714,888 | Perkens | May 28, 1929 |
| 2,477,237 | Carr | July 26, 1949 |
| 2,693,825 | Carr | Nov. 9, 1954 |

FOREIGN PATENTS

| | | |
|---|---|---|
| 275,916 | Switzerland | June 15, 1951 |